United States Patent
Furuta

(10) Patent No.: US 6,695,706 B2
(45) Date of Patent: Feb. 24, 2004

(54) CONSTANT VELOCITY JOINT BOOT

(75) Inventor: Yuji Furuta, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/263,648

(22) Filed: Oct. 4, 2002

(65) Prior Publication Data

US 2003/0069075 A1 Apr. 10, 2003

(30) Foreign Application Priority Data

Oct. 4, 2001 (JP) .................................... P2001-308620

(51) Int. Cl.[7] .................................................. F16J 3/04
(52) U.S. Cl. ...................... 464/175; 277/636; 277/637
(58) Field of Search ........................... 464/175; 403/50, 403/51; 277/635, 636, 634, 637

(56) References Cited

U.S. PATENT DOCUMENTS

| | | | | |
|---|---|---|---|---|
| 2,473,618 A | * | 6/1949 | Stillwagon, Jr. | ............ 464/175 |
| 4,558,869 A | * | 12/1985 | Grove et al. | ................. 277/315 |
| 4,559,025 A | * | 12/1985 | Dore | ........................... 464/175 |
| 4,726,611 A | * | 2/1988 | Sauer | .......................... 285/110 |
| 4,936,811 A | * | 6/1990 | Baker | .......................... 464/175 |
| 5,078,652 A | * | 1/1992 | Baker | .......................... 464/175 |
| 5,529,538 A | | 6/1996 | Schulz et al. | |
| 6,089,574 A | * | 7/2000 | Sadr et al. | ................... 277/636 |

FOREIGN PATENT DOCUMENTS

JP         U-02-87131          7/1990

* cited by examiner

*Primary Examiner*—Lynne H. Browne
*Assistant Examiner*—Kenn Thompson
(74) *Attorney, Agent, or Firm*—Posz & Bethards, PLC

(57) ABSTRACT

Ring-shaped ridges (23, 24) that extends in the circumferential direction and is capable of falling toward a bellows portion (12) when a larger cylindrical portion (11) comes into press contact therewith are formed on the outer peripheral surface of the bushing (2). Since the ring-shaped ridges (23, 24) fall toward the bellows portion (12) when being tightened, when a pressure is exerted from grease, the pressure acts in the direction of restoring the ring-shaped ridge (23) to the original posture. Therefore, the ring-shaped ridge (23) serves as a dam and is brought into press contact with the larger cylindrical portion (11) at a high bearing pressure.

20 Claims, 2 Drawing Sheets

GREASE PRESSURE

CONSTANT VELOCITY JOINT BOOT

The present application is based on Japanese Patent Application No. 2001-308620, which is incorporated herein by reference.

BACKGROUND OF THE INVENTION

1. Field of the Invention

The present invention relates to a boot for covering a constant velocity joint that is served as a joint for a drive shaft of the front-wheel-drive vehicle for protecting the joint portion of the constant velocity joint from invasion of water or dust.

2. Related Art

Hitherto, the joint portion of the constant velocity joint is covered by an accordion-folded boot in which grease is encapsulated and is protected from invasion of water or dust, so that smooth revolution at broad angle is ensured. The constant velocity joint boot includes a larger cylindrical portion of large diameter to be held by a joint outer race, a smaller cylindrical portion being smaller than the larger cylindrical portion in diameter to be held by a shaft, and a bellows portion of substantially conical shape for integrally connecting the larger cylindrical portion and the smaller cylindrical portion. When in use, the bellows portion deforms in accordance with the angle (joint angle) formed between the joint outer race and the shaft, and thus the joint portion is reliably sealed by the boot even when the angle increases.

In past days, the constant velocity joint boot used to be formed of rubber in many cases. However, since rubber has a problem in durability, thermoplastic elastomer being superior in weather resistance and in fatigue resistance is used in recent years. On the other hand, the constant velocity joint boot is required to be provided with a sealing performance to prevent water or dust reliably from invading into the joint. However, there was such problem that thermoplastic elastomer, when being employed as material, cannot ensure enough sealing performance as rubber because of its low resiliency. Though blow molding is convenient as a method for forming the constant velocity joint boot, it is difficult to form the shape of the inner peripheral surface of the larger cylindrical portion so as to have a high sealing performance by blow molding. Therefore, it is difficult to ensure a sealing performance with respect to the mating member from these points of view.

Accordingly, in JP-U-02-87131, a constant velocity joint boot in which the boot body is formed of polyester thermoplastic elastomer, and a ring-shaped bushing formed of soft rubber is inserted into the larger cylindrical portion thereof is disclosed. According to the constant velocity joint boot of this type, the bushing can be manufactured with a high degree of accuracy by injection molding or the like. Therefore, the shape accuracy of the boot body does not have to be so high, and thus the boot body may be manufactured by blow molding. A tightening force from the clamp is transmitted to the bushing via the larger cylindrical portion, and resilient deformation and hence tight adherence of the bushing with the mating member establish the sealing performance. In other words, durability is established by the boot body and the sealing performance with respect to the mating member is established by the bushing. Furthermore, the boot body, being larger in shape than the bushing, may be manufactured by blow molding, which results in reduction of the number of process and hence of the costs.

However, when manufacturing the boot body by blow molding, there remains such problem that the accuracy of the internal surface and the accuracy of the thickness are poor. Therefore, in the case of a constant velocity joint boot of a structure having a soft bushing inserted into the larger cylindrical portion of the boot body, when the thickness of the larger cylindrical portion varies, uniformity of the pressure exerted on sealing surface with respect to the bushing is impaired. As a consequent, there is a case in which the sealing performance between the boot body and the bushing is lowered, and thus problems such as leakage of grease arise.

SUMMARY OF THE INVENTION

With such circumstances in view, it is an object of the invention to provide a constant velocity joint boot of a construction having a soft bushing inserted into the larger cylindrical portion in which a high sealing performance with respect to the bushing is ensured even when the dimensional accuracy of the larger cylindrical portion is low.

A constant velocity joint boot according to the invention in which the aforementioned problem is solved is a constant velocity joint boot comprising:

a boot body made of a first material including
  a smaller cylindrical portion attachable to a shaft,
  a larger cylindrical portion disposed coaxially with and at a distance from the smaller cylindrical portion and being larger than the smaller cylindrical portion in diameter, and
  a conical bellows portion connecting the smaller cylindrical portion and the larger cylindrical portion; and
a ring-shaped bushing formed of a second material that is softer than the first material and having a sealing projection to be engaged with a mating member on an inner peripheral surface thereof, the boot body and the bushing being tightened on the mating member by reducing diameters thereof from the outer peripheral surface of the larger cylindrical portion;
at least one ring-shaped ridge formed on an outer peripheral surface of the bushing and extending in a circumferential direction of the boot body, the ring-shaped ridge being configured so as to fall down toward a side where the bellows portion is provided in a longitudinal direction of the boot body when the ring-shaped ridge is pressed by the larger cylindrical portion.

The ring-shaped ridge is preferably formed on the outer periphery at the position corresponding to the sealing projection. The ring-shaped ridge and the sealing projection may be formed on a common plane which is normal to an axial direction of the bushing. The ring-shaped ridge may be formed in parallel with the sealing projection.

The ring-shaped ridge may be triangular in cross section, and an angle formed between a raising surface of the ring-shaped ridge which is oriented to the bellows portion and the outer peripheral surface of the bushing is not more than 90 degrees.

Further, a groove which is in parallel with the ring-shaped ridge may be formed on the outer peripheral surface of the bushing so that the groove is engaged with the sealing projection of the larger cylindrical portion.

In the constant velocity joint boot of the invention, preferably a pair of the ring-shaped ridges are provided on the outer peripheral surface of the bushing and the groove is located between these two ring-shaped ridges in parallel therewith in the circumferential direction of the boot body.

A constant velocity joint boot of the invention is formed with a ring-shaped ridge on the outer peripheral surface of the bushing so as to extend in the circumferential direction, and the ring-shaped ridge is capable of falling toward the bellows portion when the larger cylindrical portion is brought into press contact therewith. In other words, in a state in which it is tightened by the mating member, the ring-shaped ridge being fallen toward the bellows portion is interposed between the larger cylindrical portion and the bushing, and the ring-shaped ridge is brought into press contact with the larger cylindrical portion by a resilient reaction force of its own. When a pressure is exerted from grease contained in the bellows portion, since the pressure acts in the direction to allow the ring-shaped ridge to restore its original posture, the ring-shaped ridge is further brought into press contact with the inner peripheral surface of the larger cylindrical portion. In other words, since the ring-shaped ridge serves as a dam and is brought into press contact with the larger cylindrical portion at a high bearing pressure, problem such as leakage of grease may reliably be prevented. With these actions, even when there are variations in thickness or shape of the larger cylindrical portion, a high sealing performance is established between the larger cylindrical portion and the bushing.

The ring-shaped ridge is preferably formed on the outer periphery thereof at the position corresponding to the sealing projection. Accordingly, a tightening stress is reliably transmitted from the ring-shaped ridge to the sealing projection, and thus a high bearing pressure may be established. Therefore, the sealing performance between the bushing and the mating member is further improved.

The number of the ring-shaped ridge may be one, but it is preferable to form a pair (two) of ring-shaped ridges substantially symmetrically along the length of the bushing. Accordingly, since a tightening stress is uniformly transmitted from the larger cylindrical portion to the bushing, variations in dimensional accuracy of the larger cylindrical portion may further be absorbed, thereby securing higher sealing performance. In this case, at least the inner (on the side of the bellows portion) ring-shaped ridge is configured in such a manner that it can be fallen toward the bellows portion when the larger cylindrical portion is brought into press contact therewith. The configuration of the outer ring-shaped ridge is not specifically limited, but when the same configuration as the inner ring-shaped ridge is employed, the outer ring-shaped ridge falls toward the bellows portion, thereby preventing leakage of grease over again. When the configuration that is capable of falling toward the outside is employed, the sealing performance with respect to water or dust invading from the outside may be improved.

Less number of ring-shaped ridges is preferable. When a large number of ring-shaped ridges are provided, a tightening force is dispersed correspondingly, and thus the bearing pressure between the respective ring-shaped ridges and the larger cylindrical portion is reduced. Therefore, the sealing performance is lowered. As a consequent, most preferably, a pair of (two) ridges are formed substantially symmetrically along the length of the bushing.

The configuration of the ring-shaped ridge may be, for example, triangular in cross section, and the angle formed between the surface extending toward the bellows portion and the outer peripheral surface of the bushing is not more than 90 degrees. In this arrangement, when being compressed by the larger cylindrical portion by being tightened, the ring-shaped ridge falls to form an angle not more than 90 degrees. Therefore, it falls reliably toward the bellows portion. The angle is preferably between 45 degrees and 90 degrees inclusive, and more preferably between 60 degrees and 90 degrees inclusive. It is also possible to form a ring-shaped recessed groove extending in the circumferential direction of the bushing on the surface of the ring-shaped ridge extending toward the bellows portion. In this case, when being compressed by the larger cylindrical portion by being tightened, since the ring-shaped ridge is bent along the recessed groove and hence is easily deformed, it falls reliably toward the bellows portion. Alternatively, the side of the ring-shaped ridge extending toward the bellows portion may be formed of material softer than that of the other side.

The boot body is preferably formed of thermoplastic elastomer for example of polyester group or of polyolefin group. This contributes to increase durability of the boot. Furthermore, though the method of molding is not specifically limited, it is preferable to form the boot by blow molding in terms of the cost. In the case of blow-molded boot body, it is difficult to control the configuration of the inner peripheral surface of the larger cylindrical portion, and the dimensional accuracy of the thickness is also low. However, according to the invention, even with such a boot body, a high sealing performance may be established with respect to the bushing.

Material of the bushing must simply be softer than the boot body, and polyolefin thermoplastic elastomer (TPO) or rubber, which is less expensive, may be employed. The molding method is not specifically limited, and thus compression molding, injection molding, or the like maybe employed. The ring-shaped ridge and the sealing projection, being formed integrally with the bushing, are soft and thus exhibit a high sealing performance when being tightened.

For reducing the diameter physically from the outer peripheral surface of the larger cylindrical portion, a clamp or the like may be employed as in the related art.

DETAILED DESCRIPTION OF THE PREFERRED EMBODIMENTS

Referring now to an embodiment, the invention will be described in detail below.

Figure 1:
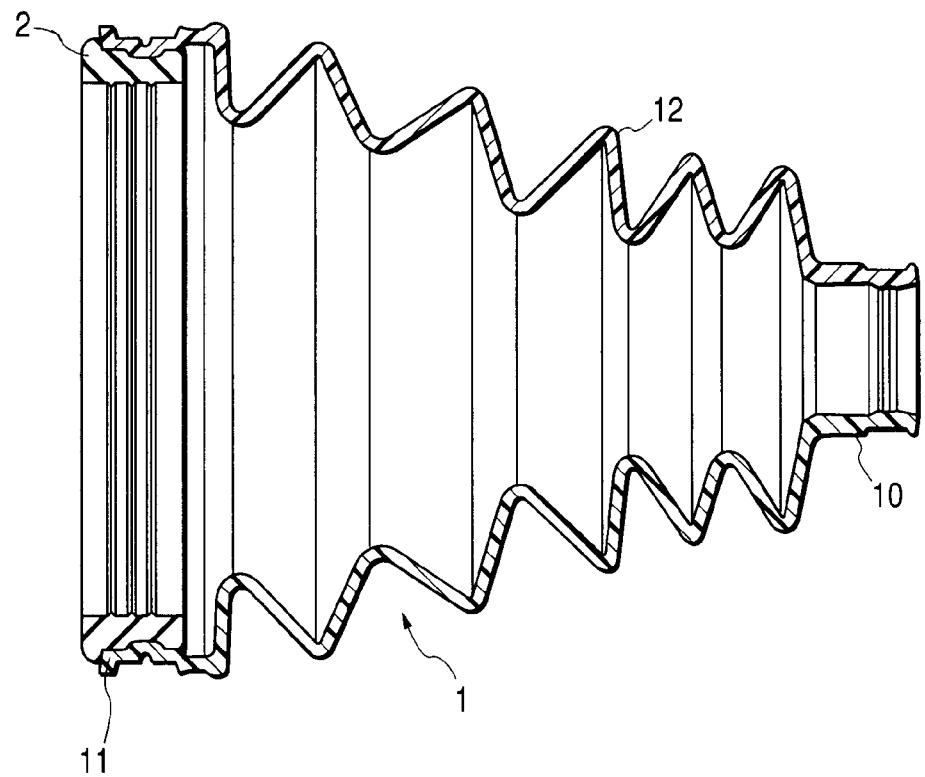
FIG. 1 is a cross sectional view of a constant velocity joint boot according to an embodiment of the invention showing a state before being tightened.
Figure 2:
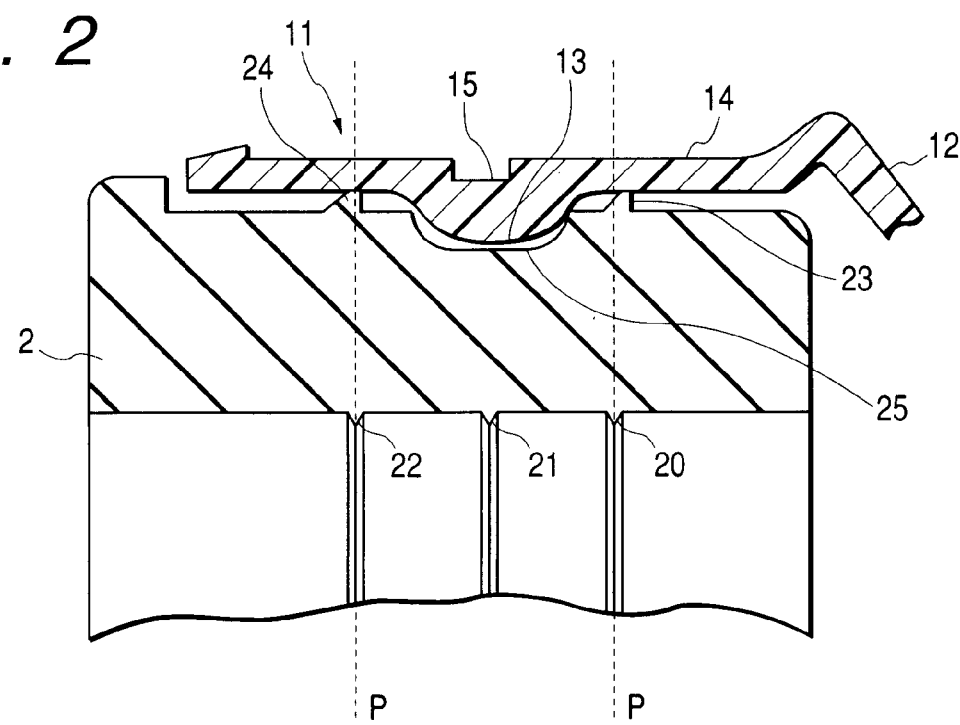
FIG. 2 is an enlarged cross sectional view showing the principal portion in FIG. 1.

The cross sectional view of the constant velocity joint boot of the present embodiment is shown in FIG. 1, and an enlarged view of the principal portion is shown in FIG. 2. The constant velocity joint boot includes a boot body 1 having a smaller cylindrical portion 10, a larger cylindrical portion 11 being larger than the smaller cylindrical portion 10 in diameter, and a bellows portion 12 in substantially conical shape for integrally connecting the smaller cylindrical portion 10 and the larger cylindrical portion 11, and a ring-shaped bushing 2 inserted into the larger cylindrical portion 11 of the boot body 1. The boot body 1 is formed of relatively hard thermoplastic elastomer by blow molding, and the bushing 2 is formed of rubber or relatively soft thermoplastic elastomer by injection molding.

The inner peripheral surface of the larger cylindrical portion 11 is formed with a ring-shaped projection 13 extending around the larger cylindrical portion 11. The surface of the projection 13 is formed in arc shape in cross section. The outer peripheral surface of the larger cylindrical portion 11 is formed with a wide and substantially flat clamp groove 14, and the portion of the clamp groove 14 corresponding to the back side of the projection 13 is formed with a ring-shaped recessed groove 15. Presence of the recessed groove 15 allows formation of the projection 13 by blow molding. A bellows portion 12 continues into the end of the clamp groove 14 on the larger cylindrical portion 11 and the end of the bellows portion 12 constitutes one end of the clamp groove 14.

Formed on the inner peripheral surface of the bushing 2 in the circumferential direction, parallel with each other, are three ring-shaped sealing projections 20, 21, 22 that are brought into resilient contact with the joint outer race, which corresponds to the mating member. Two ring-shaped ridges 23, 24 and a groove 25 positioned between two ring-shaped ridges 23, 24 are formed on the outer peripheral surface of the bushing 2 respectively in parallel with each other in the circumferential direction. The ring-shaped ridges 23, 24 and two of the sealing projections 20, 22 are formed on common planes "P" which are normal to an axial direction of the bushing 2 as shown FIG.2.

Figure 4:
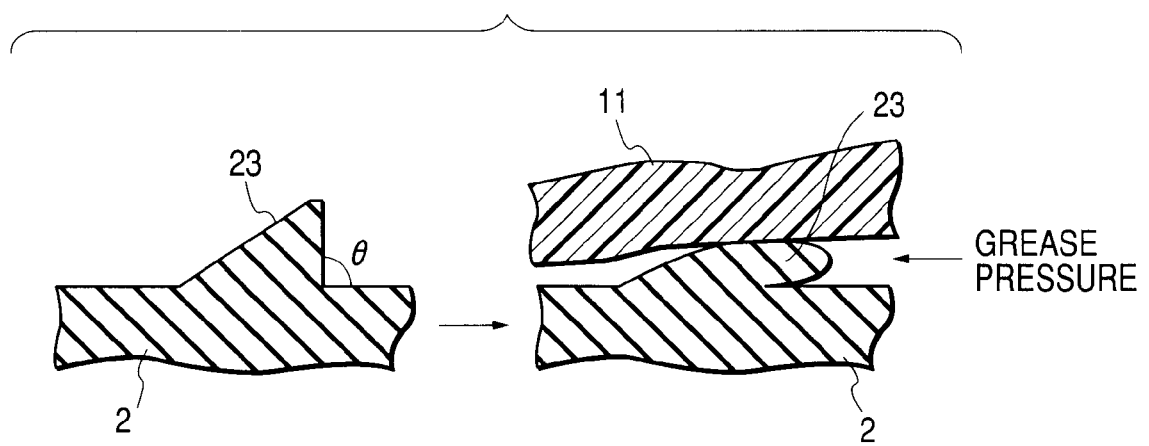
FIG. 4 is an explanatory cross sectional view showing the configuration of the ring-shaped ridges on the constant velocity joint boot according to an embodiment of the invention in a states before and after tightening.

The ring-shaped ridge 23 is formed on the concentric circle of the inner sealing projection 20 (the side of the bellows portion 12), and the ring-shaped ridge 24 is formed on the concentric circle of the outer sealing projection 22. The ring-shaped ridges 23, 24 are respectively triangular in cross section, and the angle θ formed between the surface on the bellows portion 12 and the outer peripheral surface of the bushing 2 is a right angle as shown in FIG. 4. That is, as shown in FIGS. 2 and 4, a surface of the ring shaped ridge 23 that faces the bellows portion 12 lies on a plane that is normal to the axis of the bushing 2, and a surface of the ring-shaped ridge that faces away from the bellows portion 12 is conical.

In order to assemble the constant velocity joint boot of the present embodiment, the bushing 2 is fitted into the larger cylindrical portion 11 of the boot body 1 in the first place. In this state, the ring-shaped projections 23, 24 simply abut against the inner peripheral surface of the larger cylindrical portion 11 as shown in FIG. 2, and are not deformed yet.

Figure 3:
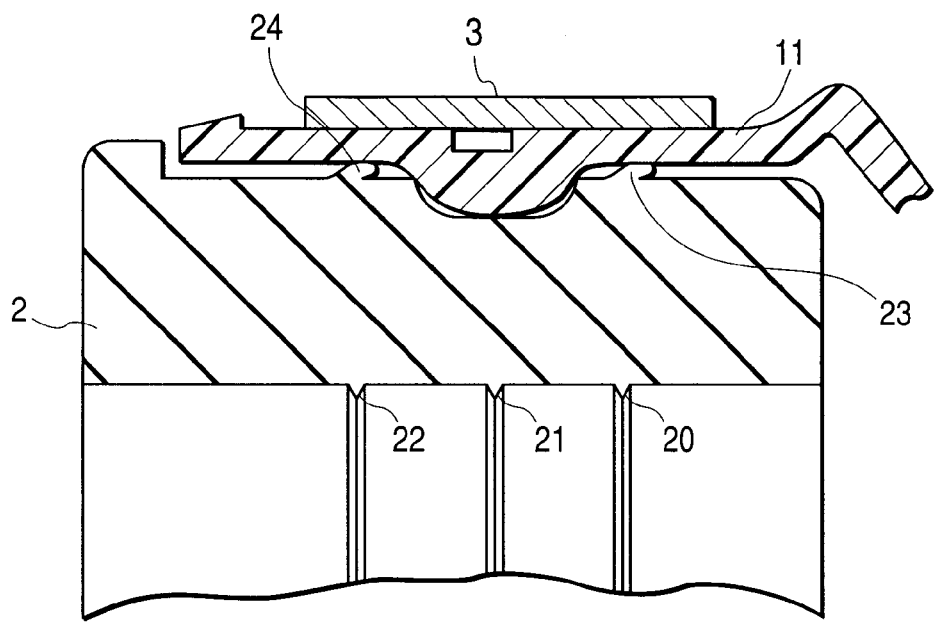
FIG. 3 is an enlarged cross sectional view showing an principal portion of the constant velocity joint boot according to an embodiment of the invention showing a state after being tightened.

Subsequently, the joint outer race is inserted in the bushing 2, and then a ring-shaped clamp 3 is disposed in the clamp groove 4 and tightened as shown in FIG. 3.

In this case, as shown in FIG. 3, a tightening force from the clamp 3 is transmitted to the ring-shaped ridges 23, 24 via the larger cylindrical portion 11, and thus the ring-shaped ridges 23, 24 are compressed in the radial direction. Then, the ring-shaped ridges 23, 24 deform resiliently so that the angle formed with respect to the outer peripheral surface of the bushing 2 is further reduced from 90 degrees into an acute angle, and fall down toward the bellows portion 12 as shown in FIG. 4.

Accordingly, in this state, two ring-shaped ridges 23, 24 are pressurized by the larger cylindrical portion 11 while inclined toward the bellows portion 12, and the two ring-shaped ridges 23, 24 themselves are pressing against the larger cylindrical portion 11 by a resilient reaction force. Therefore, a significantly high bearing pressure is generated between the larger cylindrical portion 11 and the two ring-shaped ridges 23, 24. When internal pressure is exerted on the interior of the according portion 12 due to deformation of the boot body 1, which occurs during use, and thus grease presses the sealing portion, the pressure exerted by grease acts in the direction indicated by the arrow in FIG. 4, or in the direction to restore the ring-shaped ridge 23 to its original posture, and thus the ring-shaped ridge 23 is further brought into pressing contact with the inner peripheral surface of the larger cylindrical portion 11. In other words, since the ring-shaped ridge 23 serves as a dam and is brought into pressing contact with the larger cylindrical portion 11 at a high bearing pressure, grease leakage from the interface between the larger cylindrical portion 11 and the bushing 2 may be eliminated.

In addition, in the unlikely event that the sealing performance of ring-shaped ridge 23 is impaired and grease leaks therethrough, the ring-shaped ridge 24 located in front can prevent leakage through the same action. Therefore, leakage of grease is protected over again.

Since the two ring-shaped ridges 23, 24 are located on the concentric circles of the sealing projections 20, 22 respectively, a tightening force from the clamp 3 is transmitted from the two ring-shaped ridges 23, 24 to the sealing projections 20, 22 without loss, and the sealing projections 20, 22 are tightened by the joint outer lace at a high bearing pressure. Accordingly, a high sealing performance is exhibited also between the bushing and the joint outer lace.

As is described above, according to the constant velocity joint boot of the invention, since a high bearing pressure may be established between the larger cylindrical portion and the bushing when being tightened on the mating member, and the ring-shaped ridge serves as a dam, a high sealing performance is established, thereby ensuring prevention of leakage of grease. In addition, forming the ring-shaped ridge on the outer periphery at the position corresponding to the sealing projection allows improvement of bearing pressure between the bushing and the mating member, thereby improving the sealing performance between the bushing and the mating member.

What is claimed is:

1. A constant velocity joint boot comprising:
    a boot body made of a first material including
        a smaller cylindrical portion attachable to a shaft,
        a larger cylindrical portion disposed coaxially with and at a distance from the smaller cylindrical portion and being larger than the smaller cylindrical portion in diameter, and
        a conical bellows portion connecting the smaller cylindrical portion and the larger cylindrical portion; and
    a ring-shaped bushing formed of a second material that is softer than the first material and having a sealing projection to be engaged with a mating member on an inner peripheral surface thereof, the boot body and the bushing being tightened on the mating member by reducing diameters thereof from the outer peripheral surface of the larger cylindrical portion;
    at least one ring-shaped ridge formed on an outer peripheral surface of the bushing and extending in a circumferential direction of the boot body, the ring-shaped ridge being configured so as to fall down toward a side where the bellows portion is provided in a longitudinal direction of the boot body when the ring-shaped ridge is pressed by the larger cylindrical portion.

2. A constant velocity joint boot according to claim 1, wherein the ring-shaped ridge and the sealing projection are formed on a common plane normal to an axial direction of the bushing.

3. A constant velocity joint boot according to claim 1, wherein the ring-shaped ridge is triangular in cross section, and an angle formed between a surface of the ring-shaped ridge that faces toward the bellows portion and the outer peripheral surface of the bushing is not more than 90 degrees.

4. A constant velocity joint boot according to claim 1, wherein a groove, which is parallel with the ring-shaped ridge, is formed on the outer peripheral surface of the bushing, and the groove is engaged with a projection formed on the inner peripheral surface of the larger cylindrical portion.

5. A constant velocity joint boot according to claim 4, wherein the ring-shaped ridge is one of two ring-shaped ridges that are provided on the outer peripheral surface of the bushing, and the groove is located between and is parallel to said two ring-shaped ridges.

6. A constant velocity joint boot according to claim 1, wherein the boot body is integrally formed by blow molding.

7. A constant velocity joint boot according to claim 1, wherein the ring-shaped ridge is located under a clamp.

8. A constant velocity joint boot comprising:
  a boot body made of a first material, wherein the boot body includes:
    a smaller cylindrical section, which is attachable to a shaft;
    a larger cylindrical section, which is coaxial with and spaced from the smaller cylindrical portion, and the larger cylindrical portion is larger than the smaller cylindrical portion in diameter; and
    a conical bellows section connecting the smaller cylindrical portion and the larger cylindrical portion; and
  a ring-shaped bushing formed of a second material, which is softer than the first material, wherein the ring-shaped bushing has a sealing projection on an inner peripheral surface of the ring-shaped bushing to engage with a mating member, and the boot body and the bushing are tightened on the mating member by reducing their diameters from the outer peripheral surface of the larger cylindrical portion;
  at least one ring-shaped ridge formed on an outer peripheral surface of the bushing, wherein the ring-shaped ridge extends in a circumferential direction of the boot body, and the ring-shaped ridge extends toward the larger cylindrical portion of the boot body in a radial direction from the outer peripheral surface of the bushing, the ring-shaped ridge being constructed and arranged to incline elastically toward the bellows portion in the axial direction of the bushing when the ring-shaped ridge is pressed by the larger cylindrical portion.

9. A constant velocity joint boot according to claim 8, wherein the ring-shaped ridge and the sealing projection are formed on a common plane that is normal to the axis of the bushing.

10. A constant velocity joint boot according to claim 8, wherein the ring-shaped ridge is generally triangular in cross section, and an angle formed between a surface of the ring-shaped ridge that faces toward the bellows portion and the outer peripheral surface of the bushing is not more than 90 degrees.

11. A constant velocity joint boot according to claim 8, wherein a groove, which is parallel with the ring-shaped ridge, is formed on the outer peripheral surface of the bushing, and the groove is engaged with a projection formed on the inner peripheral surface of the larger cylindrical portion.

12. A constant velocity joint boot according to claim 11, wherein the ring-shaped ridge is one of two ring-shaped ridges that are provided on the outer peripheral surface of the bushing and the groove is located between and is parallel to the two ring-shaped ridges.

13. A constant velocity joint boot according to claim 8, wherein the boot body is integrally formed by blow molding.

14. A constant velocity joint boot according to claim 8, wherein a circular clamp applies force to the larger cylindrical portion, and the ring-shaped ridge is located under the circular clamp.

15. A constant velocity joint boot comprising:
  a boot body made of a first material, wherein the boot body includes:
    a smaller cylindrical section, which is attachable to a shaft;
    a larger cylindrical section, which is coaxial with and spaced from the smaller cylindrical portion, and the larger cylindrical portion is larger than the smaller cylindrical portion in diameter; and
    a conical bellows section connecting the smaller cylindrical portion and the larger cylindrical portion; and
  a ring-shaped bushing formed of a second material, which is softer than the first material, wherein the ring-shaped bushing has a sealing projection on an inner peripheral surface of the ring-shaped bushing to engage with a mating member, and the boot body and the bushing are tightened on the mating member by reducing their diameters from the outer peripheral surface of the larger cylindrical portion;
  at least one ring-shaped ridge formed on an outer peripheral surface of the bushing, wherein the ring-shaped ridge extends continuously in a circumferential direction of the boot body, and the ring-shaped ridge extends toward the larger cylindrical portion of the boot body in a radial direction from the outer peripheral surface of the bushing, wherein a surface of the ring-shaped ridge that faces away from the boot body is generally conical, and a surface of the ring-shaped ridge that faces the boot body is generally planar and normal to the axis of the bushing, such that the ring-shaped ridge inclines elastically toward the bellows portion in the axial direction of the bushing when the ring-shaped ridge is pressed by the larger cylindrical portion.

16. A constant velocity joint boot according to claim 15, wherein the ring-shaped ridge and the sealing projection are formed on a common plane that is normal to the axis of the bushing.

17. A constant velocity joint boot according to claim 15, wherein the ring-shaped ridge is generally triangular in cross section.

18. A constant velocity joint boot according to claim 15, wherein a groove, which is parallel with the ring-shaped ridge, is formed on the outer peripheral surface of the bushing, and the groove is engaged with a projection formed on the inner peripheral surface of the larger cylindrical portion.

19. A constant velocity joint boot according to claim 18, wherein the ring-shaped ridge is one of two ring-shaped ridges that are provided on the outer peripheral surface of the bushing and the groove is located between and is parallel to the two ring-shaped ridges.

20. A constant velocity joint boot according to claim 15, wherein a circular clamp applies force to the larger cylindrical portion, and the ring-shaped ridge is located under the circular clamp.

\* \* \* \* \*